United States Patent
Li (10) Patent No.: US 12,322,287 B2
(45) Date of Patent: Jun. 3, 2025

(54) SYSTEMS AND METHODS FOR CONTROLLING THE FLASHING YELLOW LEFT TURN SIGNAL AT TRAFFIC INTERSECTIONS TO IMPROVE PEDESTRIAN SAFETY

(71) Applicant: Board of Regents, The University of Texas System, Austin, TX (US)

(72) Inventor: Pengfei Li, Southlake, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 0 days.

(21) Appl. No.: 18/132,211

(22) Filed: Apr. 7, 2023

(65) Prior Publication Data

US 2023/0326336 A1     Oct. 12, 2023

Related U.S. Application Data (60) Provisional application No. 63/328,988, filed on Apr. 8, 2022, provisional application No. 63/328,463, filed on Apr. 7, 2022.

(51) Int. Cl.
| | |
|---|---|
| *G08G 1/07* | (2006.01) |
| *G01S 17/93* | (2020.01) |
| *G08G 1/005* | (2006.01) |
| *G08G 1/087* | (2006.01) |
| *G08G 1/16* | (2006.01) |

(52) U.S. Cl.
CPC ............. *G08G 1/087* (2013.01); *G01S 17/93* (2013.01); *G08G 1/005* (2013.01); *G08G 1/166* (2013.01)

(58) Field of Classification Search
CPC ........ G08G 1/087; G08G 1/005; G08G 1/166; G01S 17/93; G01S 7/4808
See application file for complete search history.

(56) References Cited

U.S. PATENT DOCUMENTS

| | | | |
|---|---|---|---|
| 11,610,482 B2 * | 3/2023 | Gaurav | ................. G08G 1/005 |
| 11,615,702 B2 * | 3/2023 | Zhang | .............. G08G 1/096741 |
| | | | 701/117 |
| 2016/0027300 A1 * | 1/2016 | Raamot | ................ G08G 1/0145 |
| | | | 340/922 |
| 2018/0075750 A1 * | 3/2018 | Takamura | ............... H04W 4/44 |
| 2023/0215274 A1 * | 7/2023 | McDaniel | .............. G08G 1/167 |
| | | | 340/435 |

FOREIGN PATENT DOCUMENTS

JP     2018049337 A  *  3/2018

* cited by examiner

*Primary Examiner* — Toan N Pham
(74) *Attorney, Agent, or Firm* — Thomas | Horstemeyer, LLP (57) ABSTRACT

In one embodiment, a system and method for controlling flashing yellow arrow signals at a traffic intersection are configured to monitor a crosswalk that extends across one or more lanes of a crossroad onto which left turning vehicles can turn left, determine when a pedestrian cross button associated with the crosswalk has been pressed, and further determining if one or more pedestrians are within one or both pedestrian waiting zones and, if so, temporarily suspending displaying a flashing yellow arrow to the left turning vehicles so that they cannot legally make a left turn but, if not, permitting the flashing yellow arrow to be displayed to the left turning vehicles so that they can legally make a left turn.

19 Claims, 10 Drawing Sheets
(6 of 10 Drawing Sheet(s) Filed in Color)

SYSTEMS AND METHODS FOR CONTROLLING THE FLASHING YELLOW LEFT TURN SIGNAL AT TRAFFIC INTERSECTIONS TO IMPROVE PEDESTRIAN SAFETY

CROSS-REFERENCE TO RELATED APPLICATIONS

This application claims priority to U.S. Provisional Application Ser. No. 63/328,463, filed Apr. 7, 2022, and 63/328,988, filed Apr. 8, 2022, both of which are hereby incorporated by reference herein in their entireties.

NOTICE OF GOVERNMENT-SPONSORED RESEARCH

This invention was made with Government support under grant contract number 69A3551747112 awarded by the National Institute for Transportation and Communities (NITC) of the U.S. Department of Transportation (USDOT). The Government has certain rights in the invention.

BACKGROUND

Emerging vehicular technologies are modernizing transportation systems. From smartphone apps to autonomous vehicles, driving is becoming safer. However, issues of "equitable safety" are surfacing. According to a report by National Highway Traffic Safety Administration (NSHTA), pedestrian fatalities have increased by 44% from 2010 to 2019. In 2019, 6,590 pedestrians died of traffic crashes and 20% occurred at intersections, the highest in 30 years. Unfortunately, these saddening facts suggest that walking or biking on the street is less safe today. While most of our society's efforts are devoted to improving mobility and safety for vehicles, it can be said that the safety for pedestrians has been left behind.

One specific traffic situation that can be particularly hazardous to pedestrians is that of crossing a road onto which cars may make left-hand turns and, thereby, transversely cross the pedestrian's crosswalk. Needed are a system and method for separating crossing pedestrians from permissive left turning vehicles that still maximizes permissive left-turn capacities.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure may be better understood with reference to the following figures. Matching reference numerals designate corresponding parts throughout the figures, which are not necessarily drawn to scale.

DETAILED DESCRIPTION

As described above, there is a need for a system and method for separating crossing pedestrians from permissive left turning vehicles that maximizes permissive left-turn capacities. Examples of such systems and methods are disclosed herein. In some embodiments, a system comprises an object detection and tracking system to monitor pedestrians near or within crosswalks, and uses the pedestrians' presence and locations in controlling the flashing yellow arrow signal that can be displayed to left turning vehicles that could cross over the crosswalk when executing a left turn. In some embodiments, a dynamic flashing yellow arrow control algorithm is used to temporarily suspend the flashing yellow arrow operation in particular situations in which it is more likely that a left turning vehicle will hit a pedestrian crossing the road using a crosswalk. Although the control algorithm is configured to intermittently suspend the flashing yellow arrow signal, the algorithm still operates in a manner in which permissive left-turn throughput is maximized to the extent possible while still providing protection to pedestrians.

In the following disclosure, various specific embodiments are described. It is to be understood that those embodiments are example implementations of the disclosed inventions and that alternative embodiments are possible. Such alternative embodiments include "hybrid" embodiments that include features from different disclosed embodiments. All such embodiments are intended to fall within the scope of this disclosure.

Definitions

For the purposes of this disclosure, the following terms have the meanings identified below:

occupied road: a road that a vehicle at least initially occupies crossroad: a road that crosses the occupied road intersection: the point at which the occupied road and the crossroad intersect left turning vehicle: a vehicle that is going to turn, is turning, or has turned left from the occupied road onto the crossroad traffic: one or more vehicles on the occupied road and/or crossroad that are within or near the intersection opposing traffic (or vehicles): vehicles on the occupied road that approach the intersection from a direction opposite to that of the left turning vehicle left-turn lane: a lane of the occupied road from which the left turning vehicle can make a left turn onto the crossroad traffic signal (or light): a typically lighted signal that is displayed to vehicles at the intersection that indicates when and where the vehicles may drive traffic signal (or light) cycle: the full cycle of traffic signals (or lights) displayed to vehicles at the intersection green light: a green, typically round traffic signal that indicates that vehicles within an associated lane may proceed forward through the intersection yellow light: a yellow, typically round traffic signal that indicates that vehicles within an associated lane may proceed forward through the intersection with caution red light: a red, typically round traffic signal that indicates that vehicles within an associated lane may not proceed forward through the intersection green arrow: a green, arrow-shaped traffic signal that indicates that vehicles within an associated lane may turn onto the crossroad in the direction of the arrow red arrow: a red, arrow-shaped traffic signal that indicates that vehicles within an associated lane may not turn onto the crossroad in the direction of the arrow yellow arrow: a yellow, arrow-shaped traffic signal that indicates that vehicles within an associated lane may turn onto the crossroad in the direction of the arrow if there is no opposing traffic flashing yellow arrow (FYA): a flashing yellow, arrow-shaped traffic signal that indicates that left turning vehicles within the left-turn lane may turn left onto the crossroad if there is no opposing traffic and no pedestrians that would interfere with the turn opposing green light: a green, typically round traffic signal that is displayed to the opposing traffic on the occupied road that indicates that the opposing traffic within an associated lane may proceed forward through the intersection opposing green phase: a period of time during which the opposing green light is displayed to the opposing traffic opposing yellow light: a yellow, typically round traffic signal that may be displayed to the opposing traffic on the occupied road immediately prior to the start of the opposing green phase pedestrian signal (or light): a typically lighted signal that is displayed to passengers at the intersection that indicates when the pedestrians may and may not cross the crossroad crosswalk: a designated and marked portion of the crossroad along which pedestrians can cross the crossroad walk signal: a typically lighted signal, which may comprise the word "WALK" or a symbol depicting a walking person, that indicates that a pedestrian may enter the crosswalk and cross the crossroad flashing walk signal: a flashing version of the walk signal that identifies a pedestrian clearance period that indicates to pedestrians that the crossing period is ending and that, while pedestrians within the crosswalk may continue crossing the crossroad, pedestrians not yet in the crosswalk may not enter the crosswalk pedestrian walk phase: the period of time, concurrent with the opposing green phase, during which the walk signal is displayed to pedestrians pedestrian cross button: a button a pedestrian on the side of the crossroad may press to request the pedestrian walk phase pedestrian call: an instance of a pedestrian pressing the pedestrian cross button Introduction As noted above, the flashing yellow arrow is a left-turn strategy that permits vehicles to turn left onto a crossroad when it appears safe to do so. However, that strategy cannot separate concurrent crossing pedestrians from such left turning vehicles. To address this issue, a novel dynamic flashing yellow arrow (occasionally referred to herein as "DFYA") system and method have been developed that can address the safety concerns associated with flashing yellow arrow turns while recovering the permissive left-turn capacity after the concurrent pedestrians have crossed the crossroad and, therefore, have cleared the crosswalk. Depending on the pedestrian volumes, the corresponding flashing yellow arrow of each traffic light cycle will (i) start as scheduled, (ii) be postponed, or (iii) be canceled. In some embodiments, the dynamic flashing yellow arrow system and method use an object detection and tracking technology, such as light detection and ranging (LiDAR), to detect and track pedestrians, and further use the pedestrians' presence and locations in controlling the flashing yellow arrow signal. Although the use of LiDAR is discussed in this disclosure, it is noted that any accurate object detection and tracking technology (i.e., system and/or method) can be used in the dynamic flashing yellow system and method for the same purpose. Other examples of object detection and tracking technologies include computer vision (e.g., video) systems and radio detection and ranging (RADAR) systems.

A prototype dynamic flashing yellow arrow system and method was deployed at an intersection next to the campus of the University of Texas at Arlington, and its real-time dynamic flashing yellow arrow decisions in the field were verified over 100 traffic signal cycles through simultaneous observation in the field. The system and method were further evaluated within a traffic signal simulation platform to compare their mobility performance with two permissive left-turn strategies: (1) protected+permissive left turn (PPLT) (in which in which a left turning vehicle is displayed either a green arrow or a flashing yellow arrow) and (2) PPLT with a minus-pedestrian phase (in which the flashing yellow arrow is suppressed when a pedestrian has pressed the pedestrian cross button before the opposing green phase has started). The results of those experiments reveal that the dynamic flashing yellow arrow strategy is accurate and adaptive as compared to the other two permissive left-turn strategies.

Dynamic Flash Yellow Arrow Strategy

Figure 1A:
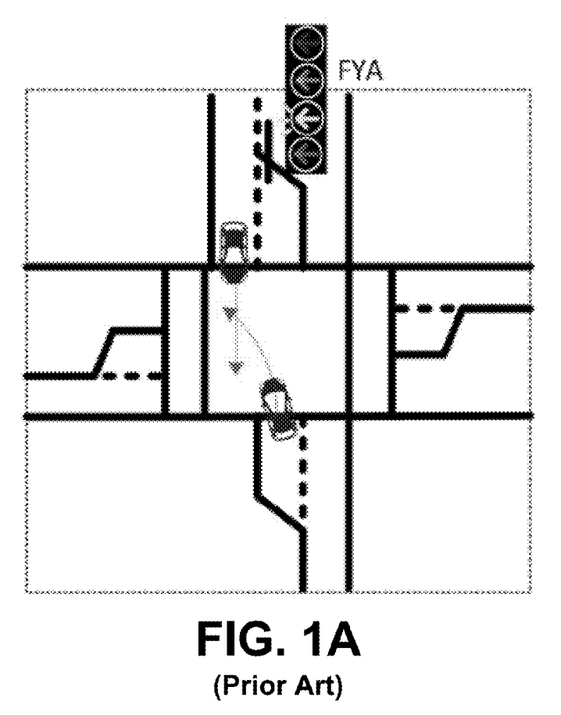
FIG. 1A is a schematic diagram illustrating the flashing yellow arrow condition.

A flashing yellow arrow indicates to left turning vehicles (or, more specifically, the drivers of those vehicles) to proceed if they can find acceptable gaps in the opposing traffic and there is no conflict with concurrent crossing pedestrians. This situation is depicted in FIG. 1A. The flashing yellow arrow is an alternative permissive left-turn mechanism permitted by the latest manual on uniform traffic control devices (MUTCD 2009) intended to avoid the "yellow trap" in the "lead-lag" phasing sequence. In the traditional permissive left-turn scheme, the left-turn signal is suppressed (not illuminated) while green lights are displayed to the other, through-traffic lanes of the occupied road. This indicates to left turning vehicles that a left can be made if there are acceptable gaps in the opposing traffic. In contrast, flashing yellow arrows are synchronized with the opposing green phase, during which opposing traffic has a green light, to ensure that the opposing green light is terminated when the left turning vehicles are displayed a steady yellow light. Flashing yellow arrows have been widely adopted for permissive left-turn movements after research concluded that the flashing yellow arrow would improve traffic safety.

Figure 1B:
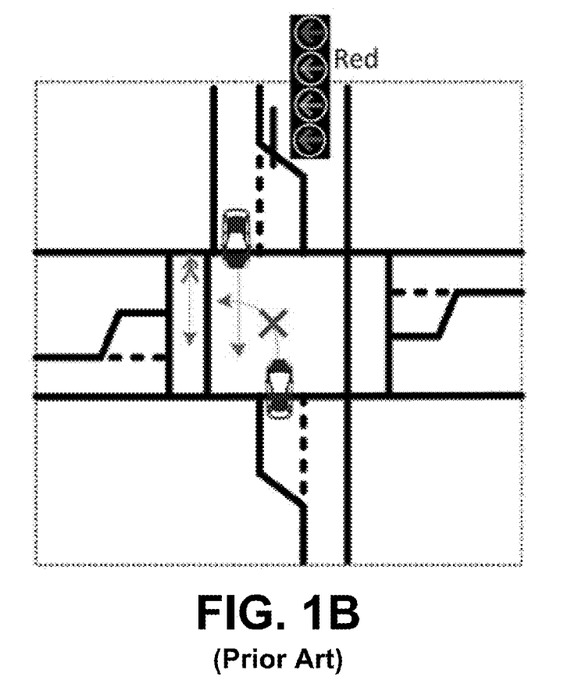
FIG. 1B is a schematic diagram illustrating the "minus-pedestrian" condition.

Although a flashing yellow arrow resolves the yellow-trap issue for left turning vehicles, it does not take into consideration the presence of concurrent crossing pedestrians. At this time, the standard flashing yellow arrow mechanism relies upon the left turning driver's judgment to avoid crashes with pedestrians, which can result in pedestrian crashes, especially in situations of heavy traffic, obstructed views, or low light. As a result, pedestrian crashes reportedly increased at many locations after the implementation of flashing yellow arrow. To address this issue, agencies either turned the flashing yellow arrow off or adopted a strategy referred to as the minus-pedestrian phase. In that strategy, illustrated in FIG. 1B, the flashing yellow arrow is suppressed either for a portion of or the entire traffic light cycle if a corresponding pedestrian phase is called.

Although the minus-pedestrian strategy separates left turning vehicles from concurrent crossing pedestrians, it also excessively eliminates permissive left-turn capability for that traffic light cycle and will not work if a pedestrian call is placed by pressing the pedestrian cross button, if the pedestrian decides not to actually cross the crossroad, or if the pedestrian crosses the crossroad in a time shorter than a programmed cross time. This mechanism often creates excessive left-turn queues during peak traffic hours when both pedestrian volumes and left turning vehicle volumes are high. The disclosed dynamic flashing yellow arrow strategy is designed to address this issue using a LiDAR-based pedestrian detection and tracking system. Concurrent crossing pedestrians have a conflict with left turning vehicles only when the pedestrians are within the so-called "hazard zone," which is described below.

Multi-Zone Pedestrian Tracking

In reality, many pedestrians press the pedestrian cross button and start to cross the crossroad before the walk signal is displayed to them or they jaywalk (i.e., cross the crossroad in an area outside of the crosswalk). In such cases, the pedestrian walk phase is not indicated (the walk signal is not displayed to the pedestrian) and flashing yellow arrow suppression is not performed during that traffic light cycle. As protecting both legitimate and illegitimate pedestrian crossings would considerably interrupt traffic signal operations, the dynamic flashing yellow arrow strategy only operates to protect those pedestrians who observe the traffic regulations. This functionality is achieved by designating distinct zones associated with the crosswalk and assisting pedestrians depending upon their locations relative to those zones.

Figure 2:
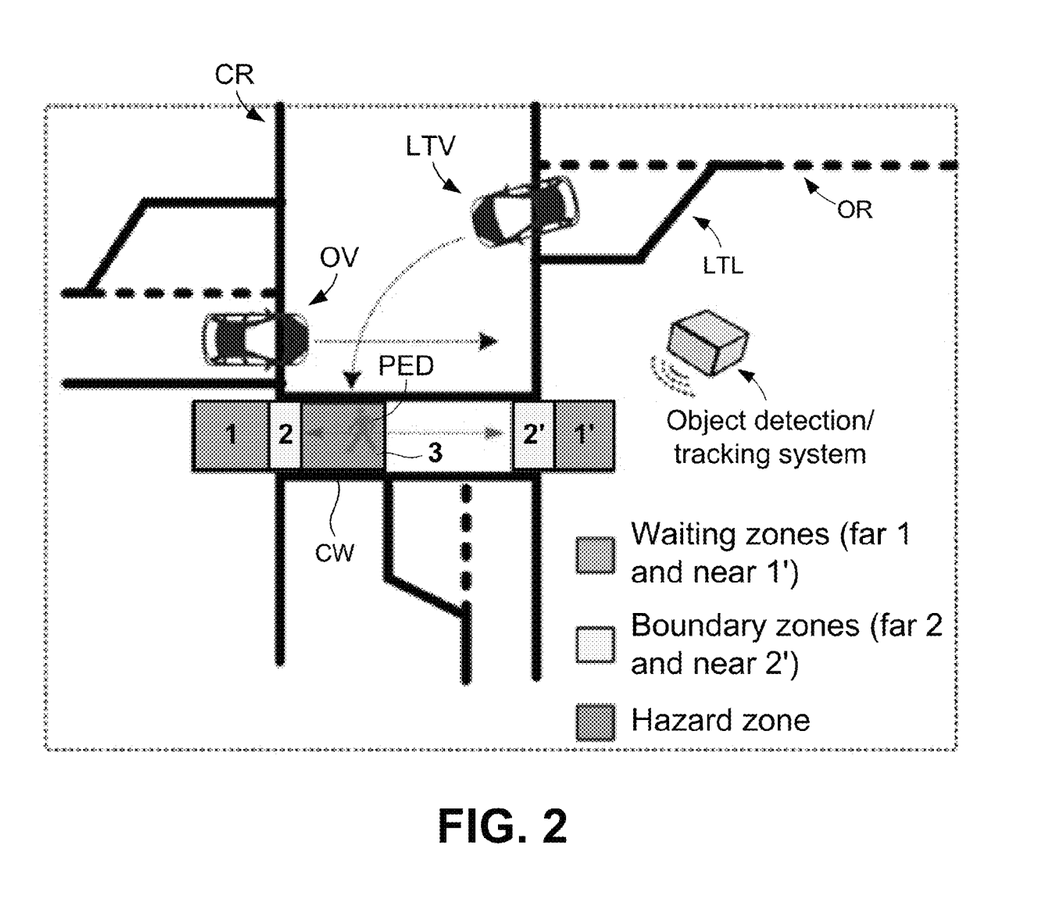
FIG. 2 is a schematic diagram illustrating an embodiment of a multi-zone pedestrian detection and tracking scheme.

FIG. 2 illustrates a crosswalk CW that extends across a crossroad CR and multiple pedestrian zones that are associated with the crosswalk. It is assumed for purposes of discussion that the crosswalk CW extends between sidewalks located on each side of the crossroad CR and at each end of the crosswalk CW. It is noted, however, that the configurations and functionalities described below apply in cases in which no actual sidewalk exists.

Beginning with a first or far side of the crossroad CR (far from the left turning vehicle LTV to the left in FIG. 2) and the first or far portion of the crosswalk CW that crosses one or more lanes of the crossroad used for a first direction of travel (and the one or more lanes onto which the left turning vehicle would turn), there is a first or far-side waiting zone 1 that occupies a portion of the sidewalk at a location adjacent to a first or far end of the crosswalk (also to the left in FIG. 2). As shown in FIG. 2, the far-side waiting zone 1 does not actually extend to or across the crosswalk CW. There is also a first or far-side boundary zone 2 that extends from the far-side waiting zone 1 and crosses into the crosswalk CW. As is apparent from FIG. 2, the far-side boundary zone 2 occupies small portions of both the sidewalk and the crosswalk CW. By way of example, the far-side boundary zone 1 extends a distance of a foot or two along both the sidewalk and the crosswalk CW along the longitudinal direction of the crosswalk. The next zone is the hazard zone 3 that that extends from the first boundary zone 2 to the inner boundary of the crossroad CR beyond which the crosswalk enters the one or more lanes of the crossroad used for a second direction of travel that is opposite to the first direction of travel. The hazard zone 3 is hazardous as it lies in the path of the left turning vehicle LTV turning left from the occupied road OR onto the crossroad CR.

Turning to the second or near side of the crossroad CR (near to the left turning vehicle LTV on the right in FIG. 2) and the second or near portion of the crosswalk CW that crosses the one or more lanes of the crossroad used for the second direction of travel, there is a second or near-side waiting zone 1' that occupies a portion of the sidewalk at a location adjacent to a second or near end of the crosswalk CW (also to right left in FIG. 2). Like the far-side waiting zone 1, the near-side waiting zone 1' does not actually extend to or across the crosswalk CW. There is also a second or near-side boundary zone 2' that extends from the near-side waiting zone 1' and crosses into the crosswalk CW. Like the far-side boundary zone 2, the near-side boundary zone 2' occupies small portions of both the sidewalk and the crosswalk CW, for example, a foot or two along both the sidewalk and the crosswalk CW along the longitudinal direction of the crosswalk. Unlike the far portion of the crosswalk CW, the near portion of the crosswalk has no separate hazard zone because the left turning vehicle LTV would not (legally) cross the near portion of the crosswalk in executing a left turn. However, the near-side pedestrians face the same potential danger when they enter the hazard zone 3 in the far portion of the crosswalk CW.

The determination whether or not to activate the dynamic flashing yellow arrow operation is made immediately prior to the start of the opposing green phase. In order for such operation to be activated, a pedestrian walk phase concurrent with the opposing green phase must be called by a pedestrian pressing the pedestrian crossing button or by traffic signal operators in the traffic operation center (TOC) remotely calling for the walk phase using appropriate control software. In either case, the walk signal is displayed. While the walk signal is displayed, the dynamic flashing yellow arrow system will first check if a pedestrian in the far-side waiting zone 1 and/or near-side waiting zone 1' enters the far-side boundary zone 2 or near-side boundary zone 2', respectively. If so, the request to cross is considered valid, the pedestrian is considered to be a "legitimate" pedestrian, and the dynamic flashing yellow arrow operation is activated. If the same pedestrian successfully reaches the opposite side of the crossroad CR, then the pedestrian's crossing is considered to have been completed. If the pedestrian cross button has been pressed but no pedestrians properly enter the intersection, the pedestrian request is ignored and the flashing yellow arrow is displayed to left turning vehicles at the onset of the opposing green phase by default. If legitimate pedestrians enter the crosswalk but do not successfully reach the opposite side of the crossroad, they are likely jaywalking pedestrians. In that case, the system will postpone the flashing yellow arrow for a certain time window and restore the flashing yellow arrow for the left turning vehicles.

Dynamic Flashing Yellow Arrow Based on Pedestrian Tracking

Figure 3A:
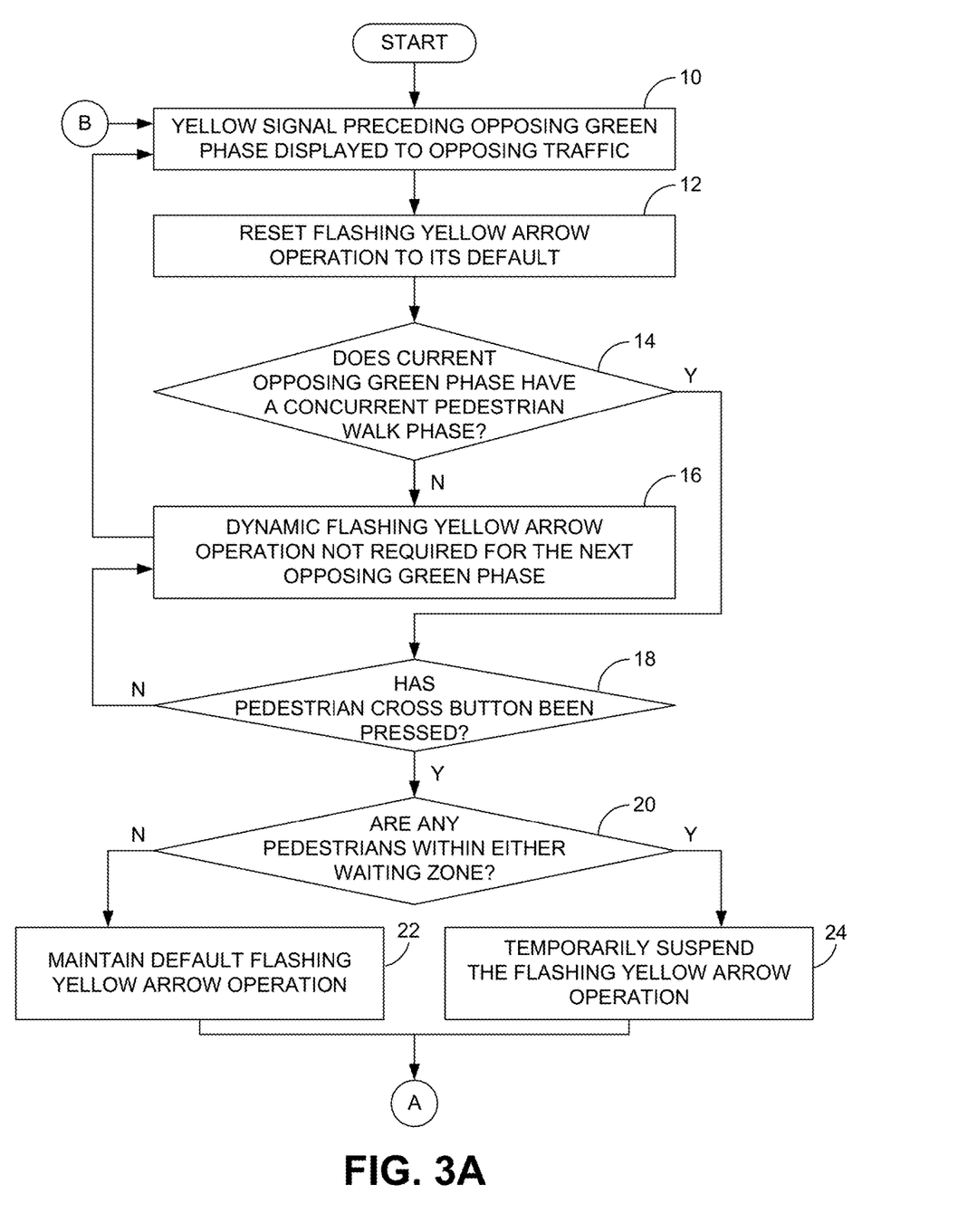
FIGS. 3A-3C comprise a flow diagram that illustrates an embodiment of operation of an embodiment of a dynamic flashing yellow light control algorithm.
Figure 3B:
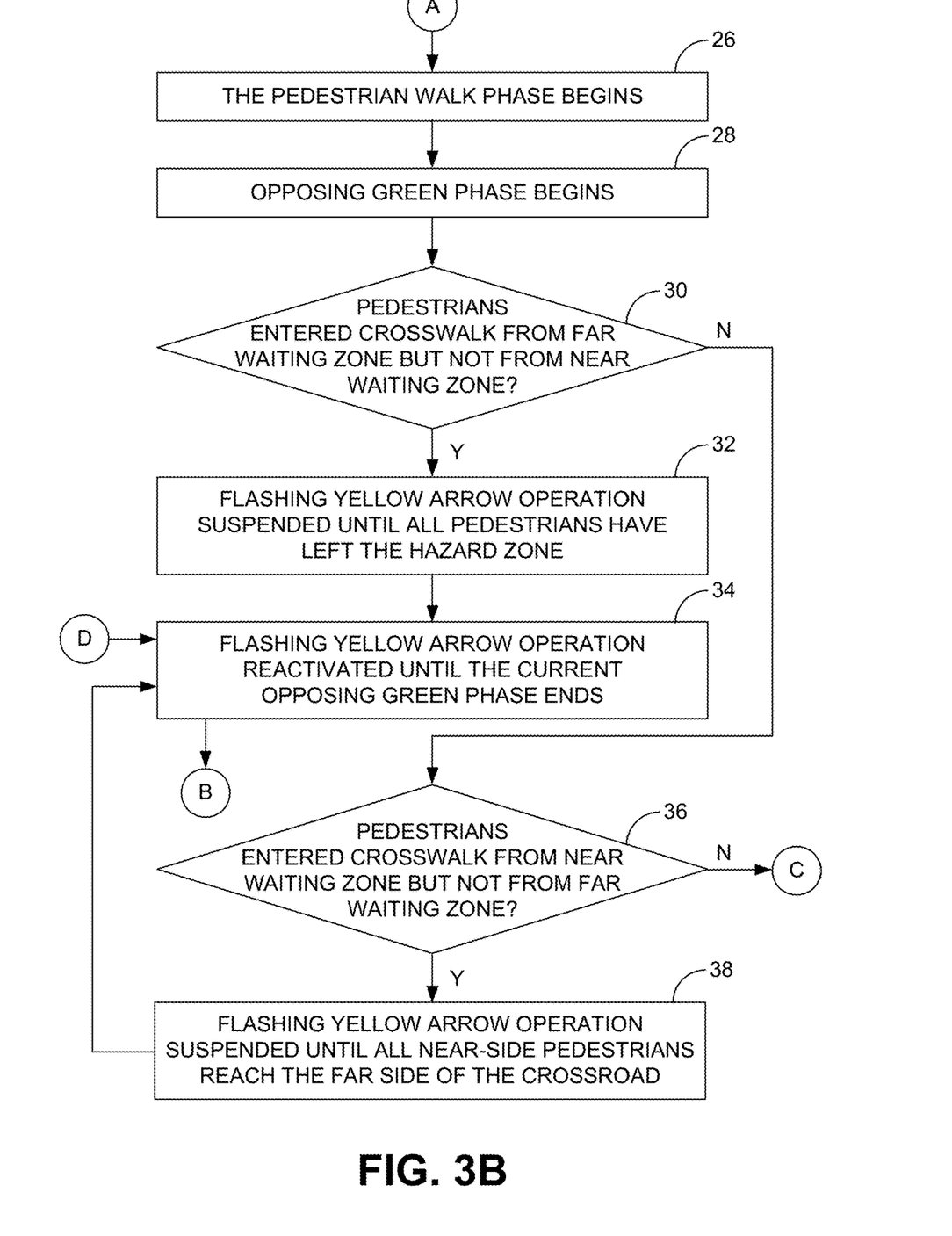
Figure 3C:
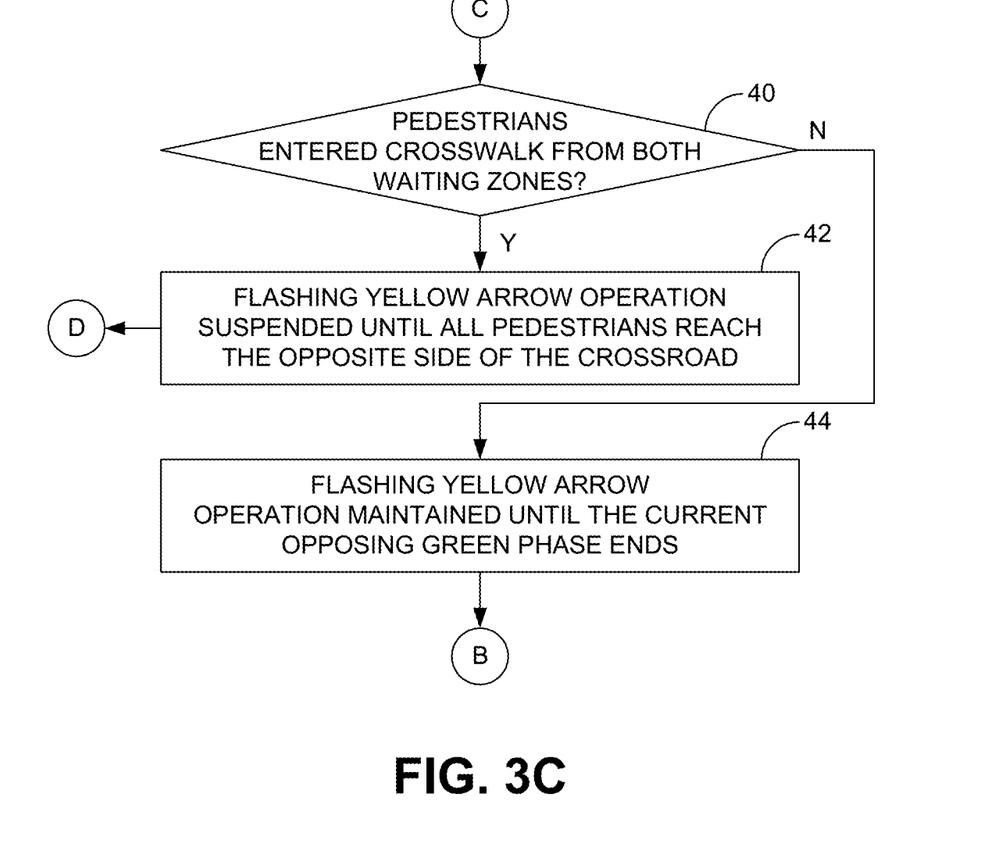

FIGS. 3A-3C is a flow diagram that illustrates an example embodiment of dynamic flashing yellow arrow operation, which can be controlled by a suitable dynamic flashing yellow arrow control algorithm. Beginning with block 10 of FIG. 3A, an initial state for the example of FIG. 3 is the part of the traffic light cycle during which yellow light(s) is/are displayed preceding the start of the opposing green phase. At this point in the cycle, the algorithm resets the flashing yellow arrow operation to its default setting (block 12), in which the flashing yellow arrow will be displayed to left turning vehicles at the onset of the opposing green phase.

Referring next to the decision block 14, flow from this point depends upon whether or not the current opposing green phase has a concurrent pedestrian walk phase. If not, the dynamic flashing yellow operation is not required for the next opposing green phase (block 16) and flow returns to block 10 and the process restarts the next time the yellow signal that immediately precedes the opposing green phase is displayed to opposing traffic. If there is a concurrent pedestrian walk phase, however, flow continues to decision block 18 at which it is determined whether or not the pedestrian cross button has been pressed. If not, the dynamic flashing yellow operation is also not required for the next opposing green phase (block 16) and flow also returns to block 10. However, if the pedestrian cross button has been pressed, flow continues to decision block 20 at which it is determined if there are any pedestrians within either waiting zone. If not, there is no legitimate pedestrian on the side of the crossroad (e.g., someone pressed the pedestrian cross button but left the waiting zone), the default flashing yellow operation is maintained, as indicated in block 22. If there is a pedestrian in either waiting zone, however, the flashing yellow arrow operation is temporarily suspended (block 24) to enable the one or more pedestrians to cross the crossroad safely.

Irrespective of whether there were pedestrians in a waiting zone, flow continues to block 26 of FIG. 3B at which point the pedestrian walk phase begins. Either concurrently or soon after the pedestrian walk phase begins, the opposing green phase begins, as indicated in block 28. At this point in the process, the actions taken by the dynamic flashing yellow arrow control algorithm depend upon whether or not pedestrians enter the crosswalk and, if so, from which side of the crosswalk. Beginning with decision block 30, it is determined whether or not pedestrians entered the crosswalk from the far-side waiting zone but not from the near-side waiting zone. If so, i.e., one or more pedestrians entered the crosswalk from the far-side waiting zone but no pedestrian entered the crosswalk from the near-side waiting zone, the flashing yellow arrow operation is temporarily suspended until all of the pedestrians who entered the crosswalk have left (passed through) the hazard zone, as indicated in block 32. Once those pedestrians have done so, the flashing yellow arrow operation is reactivated until the current opposing green phase ends, as indicated in block 34. In other words, once the pedestrians are no longer in the hazard zone, the flashing yellow arrow will be displayed to left turning vehicles for the remainder of the current opposing green phase. After that point, flow returns to block 10 of FIG. 3A and the process restarts the next time the yellow signal that immediately precedes the next opposing green phase is displayed to opposing traffic.

Referring back to decision block 30, if the circumstances are not such that pedestrians only entered the crosswalk from the far-side waiting zone, flow instead proceeds to decision block 36 at which it is determined whether or not whether or not pedestrians entered the crosswalk from the near-side waiting zone but not from the far-side waiting zone. If so, i.e., one or more pedestrians entered the crosswalk from the near-side waiting zone but no pedestrian entered the crosswalk from the far-side waiting zone, the flashing yellow arrow operation is temporarily suspended until all of the near-side pedestrians reach the far side of the crossroad, as indicated in block 38. Once those pedestrians have done so, the flashing yellow arrow operation is reactivated until the current opposing green phase ends (block 34) and flow then returns to block 10 of FIG. 3A as described above.

With reference again to decision block 36, if the circumstances are not such that pedestrians only entered the crosswalk from the near-side waiting zone, flow instead proceeds to decision block 40 of FIG. 3C at which it is determined whether or not pedestrians entered the crosswalk from both the far-side waiting zone and the near-side waiting zone. If so, i.e., one or more pedestrians entered the crosswalk from both sides of the crossroad, the flashing yellow arrow operation is temporarily suspended until all of the pedestrians reach the opposite side of the crossroad, as indicated in block 42. Once those pedestrians have done so, the flashing yellow arrow operation is reactivated until the current opposing green phase ends (block 34, FIG. 3B) and flow then returns to block 10 of FIG. 3A, as described above.

Referring back to decision block 40, if pedestrians did not enter the crosswalk from both sides of the crossroad, this means that no pedestrians entered the crosswalk from either side of the crossroad after the opposing green phase began in block 28 of FIG. 3B as flow only reached decision block 40 after it was also determined that the answers to both decision block 30 and decision block 36 were also "no." In this situation, i.e., there are no legitimate pedestrians who are crossing the crossroad and, therefore, no need to suspend the flashing yellow arrow to ensure pedestrian safety. Accordingly, as indicated in block 44, the flashing yellow arrow operation is maintained until the current opposing green phase ends. As before, once the opposing green phase has ended, flow returns to block 10 of FIG. 3A and the process restarts the next time the yellow signal that immediately precedes the next opposing green phase is displayed to opposing traffic.

As can be appreciated from the above example, a pedestrian is only relevant to the dynamic flashing yellow arrow operation if he or she has entered a waiting zone and has pressed the pedestrian cross button before the opposing green phase begins, and pedestrians who enter the crosswalk during the pedestrian clearance period (i.e., when the flashing walk signal is displayed) or who jaywalk are ignored.

Case Study I: System Evaluation Using the Emulation-In-the-Field Traffic Signal Simulation Framework The performance of an embodiment of a prototype dynamic flashing yellow arrow control algorithm was evaluated by performing an experiment that involved verifying the algorithm's real-time decisions according to observed pedestrian behaviors in the field. The framework that was used in the experiment is referred to as the "emulation-in-the-field" framework. This means that all the traffic signal inputs and pedestrian behaviors were instantaneously collected in the real world to drive dynamic flashing yellow arrow decision making. However, the dynamic flashing yellow arrow decisions were not implemented. Instead, they were only reported to the researchers for verification. The purpose of the experiment was to evaluate the algorithm's reliability and accuracy in the field.

Figure 4A:
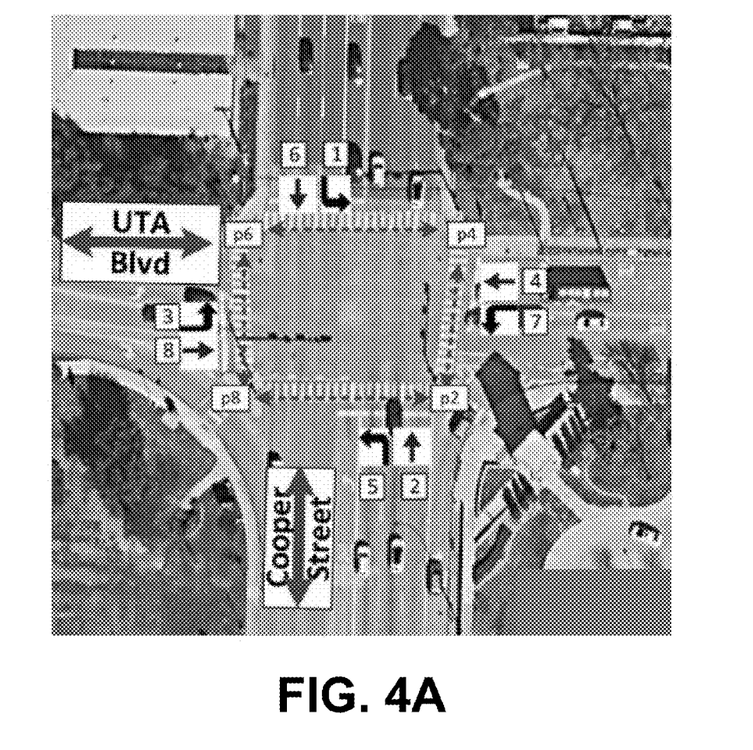
FIG. 4A is an augmented arial photograph of an actual intersection at which a prototype of a dynamic flashing yellow light system and method was tested, the augmented photograph identifying a phasing sequence of the intersection.
Figure 4B:
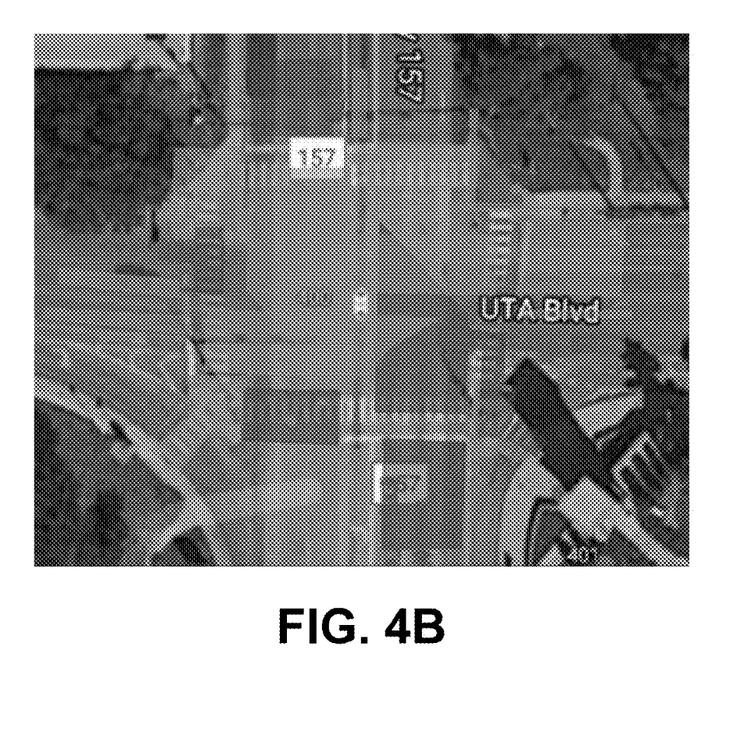
FIG. 4B is an augmented arial photograph of the intersection shown in FIG. 4A, the augmented photograph identifying pedestrian sensing zones that were used at the intersection during the testing.

The intersection selected for the experiment was the intersection of Cooper Street and UTA Boulevard, a major intersection connecting two urban campuses of the University of Texas at Arlington. The daily pedestrians crossing Cooper Street (mainline) range from 1,000 to 1,500 in a school day. The phasing sequence and pedestrian sensing zones that were used are identified in FIGS. 4A and 4B, respectively. There are four flashing yellow arrows at the intersection, one for each of the four approaches to the intersection.

Whenever an opposing green phase starts, the dynamic flashing yellow arrow control algorithm ran and reported its findings (e.g., the presence of waiting pedestrians) and decisions (e.g., suppressing or activating a flashing yellow arrow) on a console screen. At the same time, a researcher verified the reported decisions according to their observations in the field based on the expected decisions of the algorithm. The observation was carried out over 100 traffic light cycles with pedestrian crossings.

During the 100 cycles, there were 70 cycles in which at least one pedestrian call was made. Among the 70 cycles, 25 cycles only had near-side pedestrians, 25 cycles only had far-side pedestrians, and nine cycles had pedestrians on both sides. Comparing what the dynamic flashing yellow arrow control algorithm decided and what was observed in the field, it was concluded that the dynamic flashing yellow arrow control algorithm made correct decisions in 93 of the 100 cycles.

After finishing the experiment, the recorded video and identified possible reasons for incorrect dynamic flashing yellow arrow decisions were analyzed. In those failed cases, the pedestrians either unintentionally leaned on the pedestrian cross button or multiple pedestrians stood too close for the LiDAR system to separate them effectively. The accuracy of the system should increase as object detection and tracking improves.

Case Study II: System Evaluation Using a Cabinet-In-the-Loop Traffic Signal Simulation Platform Mobility Evaluation The mobility performance of the dynamic flashing yellow arrow system and method was evaluated relative to the other two common permissive left-turn strategies: (1) PPLT and (2) protected+permissive+minus-pedestrian phase. In the first of those two strategies, a green arrow followed by a flashing yellow arrow are displayed to left turning vehicles. In the second of those strategies, a green arrow is initially displayed to a left turning vehicle and it is then determined whether or not a pedestrian call has been made. If so, then a red arrow is displayed to the left turning vehicle until the end of the opposing green phase. If not, the flashing yellow arrow is displayed to the left turning vehicle.

Figure 5:
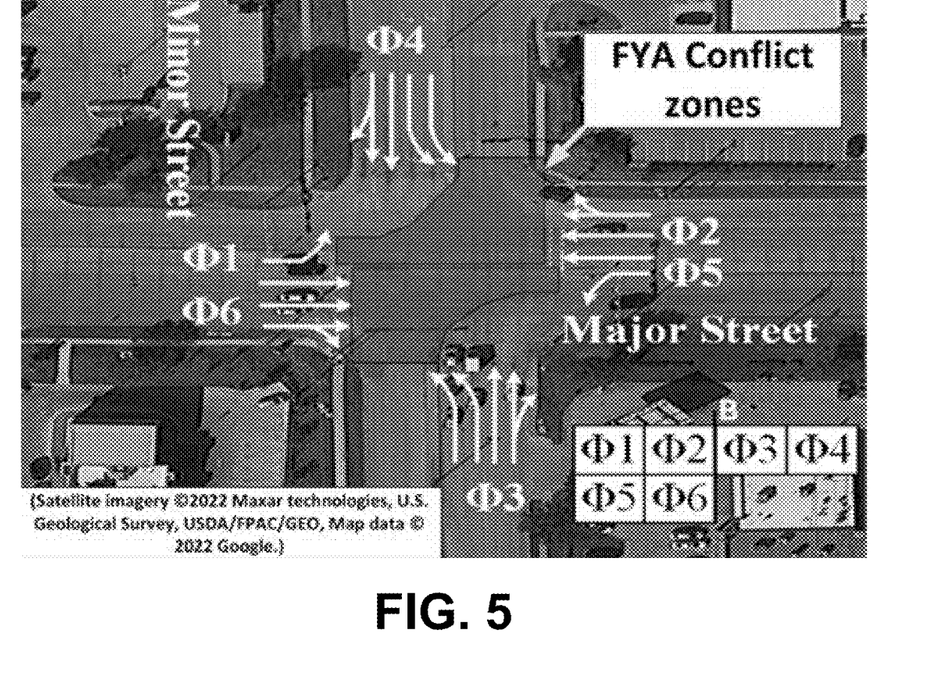
FIG. 5 is an augmented arial photograph of an actual intersection at which a prototype of the dynamic flashing yellow light control algorithm was studied.

The intersection of the West Walnut Hill Lane and North Belt Line Road in the City of Irving, Texas was selected to develop a simulation model. FIG. 5 identifies the movements and phasing sequence.

Cabinet-In-the-Loop Traffic Signal Simulation Platform

Figure 6:
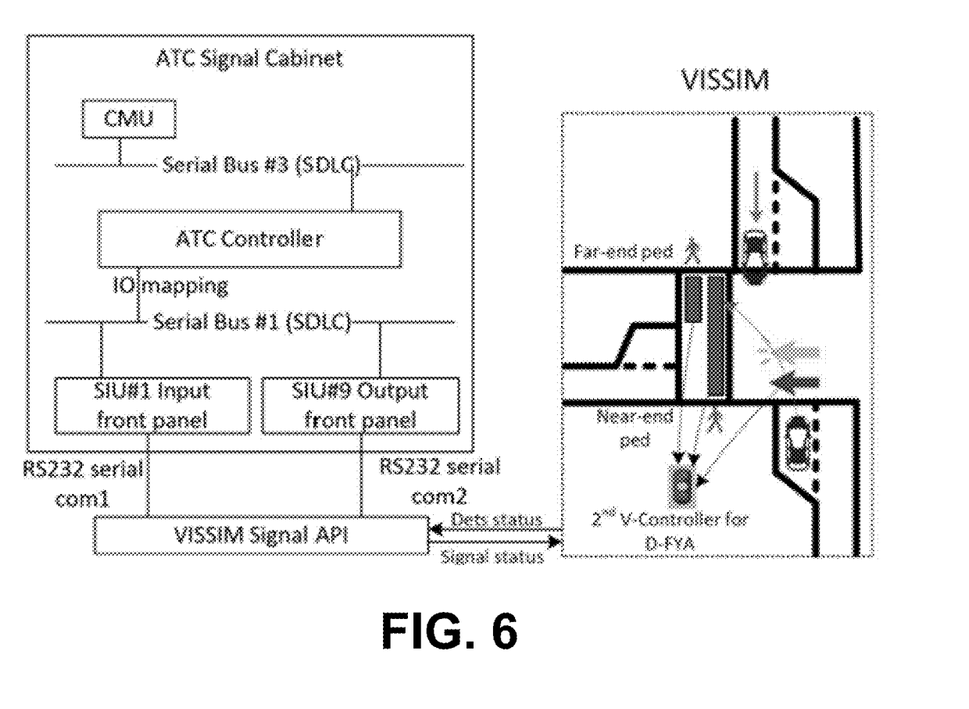
FIG. 6 is a schematic diagram illustrating the architecture of a cabinet-in-the-loop traffic signal simulation that was performed to evaluate the dynamic flashing yellow light control algorithm.

The minus-pedestrian-phase feature was not available in traffic signal controllers until very recently and, therefore, it has not yet been supported by any traffic signal simulation engine. To maintain high-fidelity and a fair comparison, a cabinet-in-the-loop traffic signal simulation platform was developed for this experiment. As shown in FIG. 6, two control units were coupled with a VISSIM simulation engine. The first control unit was a fully scaled traffic signal assembly. Through the input and out serial ports of the assembly, the latest traffic signal status was retrieved in the traffic signal controller and then sent into VISSIM simulation via the provided traffic signal control application programming interface (API). At the same time, the real-time detector status in the simulation was collected via the signal control API and sent into traffic signal assembly via its input serial port. The hardware traffic signal controller was to make decisions according to the detector inputs, including the flashing yellow arrow and minus-pedestrian phase for the flashing yellow arrow.

A challenge in this experiment was that pedestrian detection and tracking is not straightforward in simulation. To address this issue, a second virtual controller in simulation was developed for the dynamic flashing yellow arrow strategy. Its logic is to issue a red arrow if crossing pedestrians were detected, otherwise, it will display a green arrow. The virtual controller issues red light only when the pedestrian phase is activated, so pedestrians (if any) enter the intersection. The simplified dynamic flashing yellow arrow algorithm did not lose its generality because pedestrians have no random exceptions in a simulation like jaywalking.

As shown in FIG. 6, the detectors were configured to detect concurrent crossing pedestrians. Two signal heads controlled by the hardware controller and by the virtual dynamic flashing yellow arrow controller, respectively, were placed in sequence for the left turning vehicles. The permissive left turning vehicles could seek gaps and enter the intersection only if neither traffic signal head was red. As an illustration, when the opposing traffic light turns green with the concurrent pedestrian walk phase, the hardware traffic signal controller turned the first signal head to a flashing yellow arrow. Meanwhile, if the virtual controller detected the presence of crossing pedestrians, it turned red, preventing vehicles from entering the intersection. If the virtual controller did not detect the presence of a pedestrian, it displayed a green arrow to the left turning vehicle. A flashing yellow arrow and a green arrow allowed left turning vehicles to enter the intersection during the permissive left-turn phase. This configuration can, in essence, start, delay, or cancel a programmed flashing yellow arrow within a traffic light cycle.

Without a loss of generality, the left turning vehicle and the concurrent crossing pedestrian volumes were set as low, medium, and high to evaluate the performance of the three permissive left-turn strategies. The experiment also excluded the possibility of starvation by extending the left-turn lanes to ensure the traffic was not affected by different permissive left-turn strategies.

Nine simulation scenarios were generated with the combination of available vehicle and pedestrian volumes. They are referred to as follows:
1. LVLP: low vehicle volumes and low pedestrian volumes.
2. LVMP: low vehicle volumes and medium pedestrian volumes.
3. LVHP: low vehicle volumes and high pedestrian volumes.
4. MVLP: medium vehicle volumes and low pedestrian volumes.
5. MVMP: medium vehicle volumes and medium pedestrian volumes.

6. MVHP: medium vehicle volumes and high pedestrian volumes.
7. HVLP: high vehicle volumes and low pedestrian volumes.
8. HVMP: high vehicle volumes and medium pedestrian volumes.
9. HVHP: high vehicle volumes and high pedestrian volumes.

Figure 7:
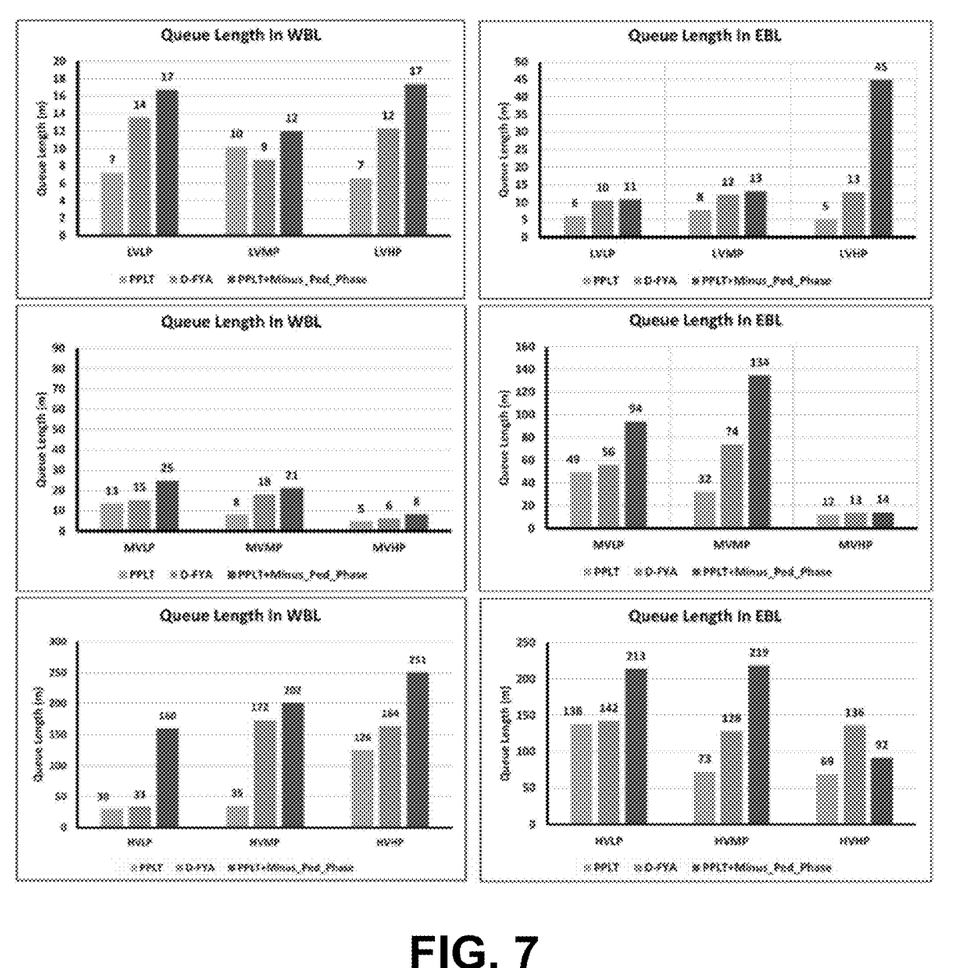
FIG. 7 comprises graphs that illustrate left-turn lane queue lengths for multiple permissive left-turn strategies that were evaluated in the simulation.

FIG. 7 shows the left-turn queue length (m) comparison among the three permissive left-turn strategies and reveals that the mobility performance of dynamic flashing yellow arrow was between the PPLT and the PPLT+minus-pedestrian phase in most cases. In some cases, the dynamic flashing yellow arrow was much better than the PPLT+minus-pedestrian phase (e.g., the MVHP scenarios) in mobility when separating the left turning vehicles and pedestrians. When the opposing traffic and pedestrian volumes were both high, all three permissive left-turn strategies degraded to the protected-only left-turn strategies (e.g., the HVHP scenario).

DISCUSSION

Figure 8:
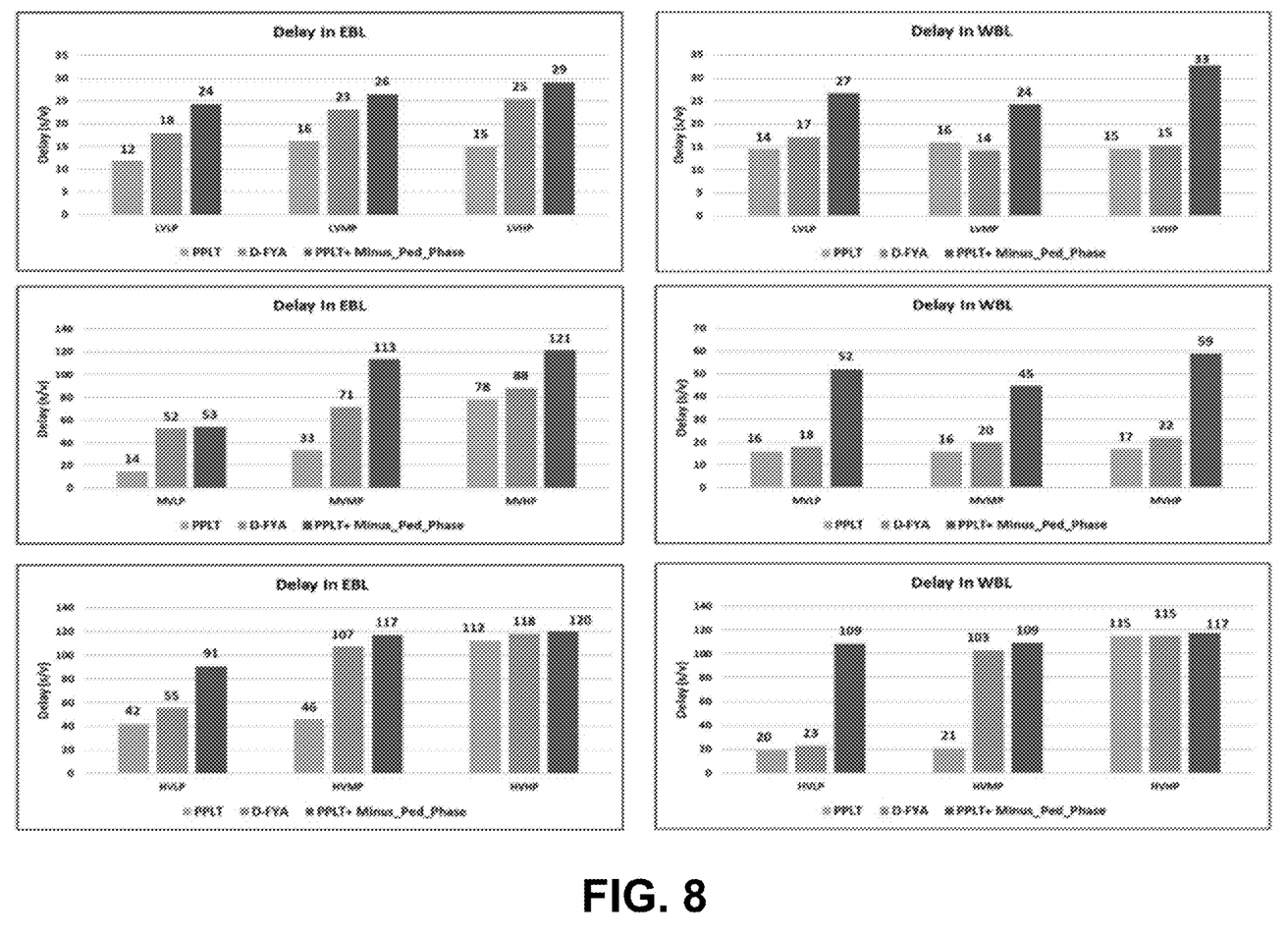
FIG. 8 comprises graphs that illustrate left-turn lane delays for multiple permissive left-turn strategies that were evaluated in the simulation.

It can be concluded from the simulation results presented in FIG. 8 that, for both low and medium traffic conditions, PPLT and dynamic flashing yellow arrow had better performance over the PPLT+minus-pedestrian phase, whereas dynamic flashing yellow arrow and PPLT with a minus-pedestrian phase have the same pedestrian protection. However, when both vehicle and pedestrian volumes increase to a high level, all three permissive left-turn strategies exhibit similar delays and queue lengths to the protected-only left-turn strategy because the left turning vehicles cannot find acceptable gaps while the flashing yellow arrow is displayed. This suggests that any permissive left-turn strategies under certain scenarios may need to be prohibited.

Safety Evaluation

The performance of dynamic flashing yellow arrow versus standard flashing yellow arrow strategies in decreasing traffic conflicts in terms of near misses, average time-to-collision (TTC), and post-encroachment time (PET) was also studied. Using the same simulation platform described above, two zones were drawn in the traffic simulation model to collect traffic conflicts relevant to the flashing yellow arrow, including the traffic conflicts among permissive left turning vehicles, opposing traffic, and concurrent crossing pedestrians. The simulation model was then set to output a raw data file for traffic conflict analysis based on safety surrogate assessment model (SSAM).

With typical values for max TTC (3 sec) and PET (5 sec), the raw trajectory files from VISSIM were postprocessed with Version 3 of the open-source SSAM provided by the Federal Highway Administration (2017). Each simulation scenario lasted 60 minutes with 10 repetitions and different random seeds. To simplify the results, the minus-pedestrian-phase feature was discarded in the traffic conflict analysis to ensure the difference of traffic conflicts were only caused by standard flashing yellow arrow and dynamic flashing yellow arrow strategies.

The results indicated that the number of conflicts caused by permissive left turns can be significantly reduced under the dynamic flashing yellow arrow control strategies, and the differences between mean TTC and PED were not significant under the flashing yellow arrow and dynamic flashing yellow arrow control strategies.

CONCLUSION

As described above, a novel dynamic flashing yellow arrow system and method was developed to leverage the permissive left-turn capacity and maximize crossing pedestrians' safety using an object detection and tracking technology, such as LiDAR. Through a novel emulation-in-the-field traffic signal control framework, the resilience of the disclosed dynamic flashing yellow arrow algorithm to random pedestrian behaviors and mitigations to inaccurate pedestrian detections were verified. Compared with the traditional flashing yellow arrow, the disclosed dynamic flashing yellow arrow offers four permissive left-turn options for vehicles according to the instantaneous waiting pedestrian's presence at different locations. The system and method was determined to provide a highly flexible mechanism to separate the left turning vehicles from concurrent pedestrians while maximizing the remaining permissive left-turn capacities.

In addition, in a controlled simulation environment, two common permissive left-turn strategies were evaluated along with the dynamic flashing yellow arrow strategy. It was concluded that the disclosed dynamic flashing yellow arrow strategy would be more efficient than the PPLT with a minus-pedestrian phase. At the same time, it can effectively reduce the traffic conflicts related to flashing yellow arrows according to the SSAM. It was also determined that, when there was high levels of opposing traffic, all three permissive left-turn strategies degraded to the protected-only control strategy, leading to high delays and long queues.

Computer Implementation

Figure 9:
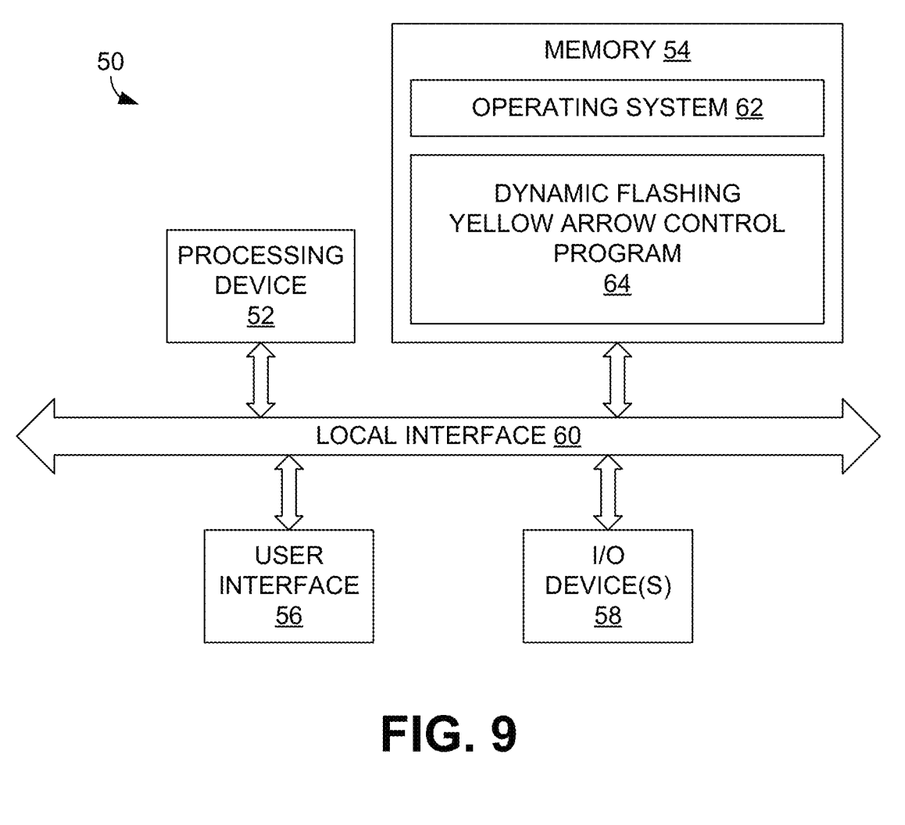
FIG. 9 is a schematic diagram of an embodiment of a computing device that can be used to execute a dynamic flashing yellow arrow strategy.

FIG. 9 is a block diagram of an example embodiment for a computing device 50 that can be used to practice the disclosed dynamic flashing yellow arrow strategy. The computing device 50 generally comprises a processing device 52, memory 54, a user interface 56, and one or more input/output (I/O) devices 58, each of which is connected to a system bus 60. The processing device 52 can, for example, include a central processing unit (CPU) that is capable of executing computer-executable instructions stored within the memory 54. The memory 54 can include any one of or a combination of volatile memory elements (e.g., RAM, flash, etc.) and nonvolatile memory elements (e.g., hard disk, ROM, etc.). The user interface 56 can comprise one or more devices that can enter user inputs into the computing device 50, such as a keyboard and mouse, as well as one or more devices that can convey information to the user, such as a display. The I/O devices 58 can comprise components that enable the computing device 50 to communicate with other devices.

The memory 54 (a non-transitory computer-readable medium) stores software applications (programs) including an operating system 62 and a dynamic flashing yellow arrow control program 64. The dynamic flashing yellow arrow control program 64 includes computer-executable instructions, which may be comprised by one or more algorithms (computer logic), such as a dynamic flashing yellow arrow control algorithm, which can be executed by the processing device 52 to execute the dynamic flashing yellow arrow strategy.

The invention claimed is:

1. A method for controlling flashing yellow arrow signals at a traffic intersection to improve pedestrian safety, the method comprising:
    monitoring a crosswalk that extends across one or more lanes of a crossroad onto which left turning vehicles can turn left;
    determining when a pedestrian cross button associated with the crosswalk has been pressed; and determining if one or more pedestrians are within one or both of a far-side pedestrian waiting zone located outside of the crosswalk adjacent a far end of the crosswalk and a near-side pedestrian waiting zone located outside of the crosswalk adjacent a near end of the crosswalk and, if so, temporarily suspending displaying a flashing yellow arrow to the left turning vehicles so that they cannot legally make a left turn but, if not, permitting the flashing yellow arrow to be displayed to the left turning vehicles so that they can legally make the left turn.

2. The method of claim 1, wherein monitoring the crosswalk comprises detecting and tracking pedestrians in relation to the far-side and near-side pedestrian waiting zones and a hazard zone located within the crosswalk that extends across the one or more lanes of the crossroad.

3. The method of claim 2, wherein detecting and tracking pedestrians comprises detecting and tracking the pedestrians using a light detection and ranging (LiDAR) system.

4. The method of claim 2, further comprising, after an opposing green phase begins in which traffic opposing the left turning vehicles has a green light, determining if one or more pedestrians entered the crosswalk from the far-side pedestrian waiting zone but not from the near-side pedestrian waiting zone.

5. The method of claim 4, wherein if one or more pedestrians entered the crosswalk from the far-side pedestrian waiting zone but none entered the crosswalk from the near-side pedestrian waiting zone, suspending the display of the flashing yellow arrow to the left turning vehicles until all pedestrians have left the hazard zone.

6. The method of claim 5, further comprising enabling the display of the flashing yellow arrow to the left turning vehicles until the opposing green phase ends.

7. The method of claim 4, further comprising determining if one or more pedestrians entered the crosswalk from the near-side pedestrian waiting zone but not from the far-side pedestrian waiting zone.

8. The method of claim 7, wherein if one or more pedestrians entered the crosswalk from the near-side pedestrian waiting zone but none entered the crosswalk from the far-side pedestrian waiting zone, suspending the display of the flashing yellow arrow to the left turning vehicles until all near-side pedestrians have reached the far side of the crosswalk.

9. The method of claim 8, further comprising enabling the display of the flashing yellow arrow to the left turning vehicles until the opposing green phase ends.

10. The method of claim 7, further comprising determining if one or more pedestrians entered the crosswalk from each of the near-side pedestrian waiting zone and the far-side pedestrian waiting zone.

11. The method of claim 10, wherein if one or more pedestrians entered the crosswalk from each of the near-side pedestrian waiting zone and the far-side pedestrian waiting zone, suspending the display of the flashing yellow arrow to the left turning vehicles until all pedestrians have reached the opposite side of the crosswalk.

12. A dynamic flashing yellow arrow system for controlling flashing yellow arrow signals at a traffic intersection to improve pedestrian safety, the system comprising:
a detection and tracking system configured to detect and track pedestrians in relation to multiple predetermined zones associated with a crosswalk of the traffic intersection; and
a computing device that executes a dynamic flashing yellow arrow control algorithm configured to receive data from the detection and tracking system and:
determine when a pedestrian cross button associated with the crosswalk has been pressed, and
determine from the data collected by the detection and tracking system if one or more pedestrians are within one or both of a far-side pedestrian waiting zone located outside of the crosswalk adjacent a far end of the crosswalk and a near-side pedestrian waiting zone located outside of the crosswalk adjacent a near end of the crosswalk and, if so, temporarily suspend displaying a flashing yellow arrow to left turning vehicles so that they cannot legally make a left turn but, if not, permit the flashing yellow arrow to be displayed to the left turning vehicles so that they can legally make the left turn.

13. The dynamic flashing yellow arrow system of claim 12, wherein the dynamic flashing yellow arrow control algorithm is further configured to determine if one or more pedestrians entered the crosswalk from the far-side pedestrian waiting zone but not from the near-side pedestrian waiting zone and, if so, suspending the display of the flashing yellow arrow to the left turning vehicles until all pedestrians have left a hazard zone of the crosswalk.

14. The dynamic flashing yellow arrow system of claim 13, wherein the dynamic flashing yellow arrow control algorithm is further configured to determine if one or more pedestrians entered the crosswalk from the near-side pedestrian waiting zone but not from the far-side pedestrian waiting zone and, if so, suspend the display of the flashing yellow arrow to the left turning vehicles until all near-side pedestrians have reached the far side of the crosswalk.

15. The dynamic flashing yellow arrow system of claim 14, wherein the dynamic flashing yellow arrow control algorithm is further configured to determine if one or more pedestrians entered the crosswalk from each of the near-side pedestrian waiting zone and the far-side pedestrian waiting zone and, if so, suspend the display of the flashing yellow arrow to the left turning vehicles until all pedestrians have reached the opposite side of the crosswalk.

16. A non-transitory computer-readable medium that stores a dynamic flashing yellow arrow control algorithm configured to:
determine when a pedestrian cross button associated with a crosswalk of a traffic intersection has been pressed; and
determine from data collected by a detection and tracking system that tracks pedestrians in relation to multiple predetermined zones associated with the crosswalk if one or more pedestrians are within one or both of a far-side pedestrian waiting zone located outside of the crosswalk adjacent a far end of the crosswalk and a near-side pedestrian waiting zone located outside of the crosswalk adjacent a near end of the crosswalk and, if so, temporarily suspend displaying a flashing yellow arrow to left turning vehicles so that they cannot legally make a left turn but, if not, permit the flashing yellow arrow to be displayed to the left turning vehicles so that they can legally make the left turn.

17. The non-transitory computer-readable medium of claim 16, wherein the dynamic flashing yellow arrow control algorithm is further configured to determine if one or more pedestrians entered the crosswalk from the far-side pedestrian waiting zone but not from the near-side pedestrian waiting zone and, if so, suspending the display of the flashing yellow arrow to the left turning vehicles until all pedestrians have left a hazard zone of the crosswalk.

18. The non-transitory computer-readable medium of claim 17, wherein the dynamic flashing yellow arrow control algorithm is further configured to determine if one or more pedestrians entered the crosswalk from the near-side pedestrian waiting zone but not from the far-side pedestrian waiting zone and, if so, suspend the display of the flashing yellow arrow to the left turning vehicles until all near-side pedestrians have reached the far side of the crosswalk.

19. The non-transitory computer-readable medium of claim 18, wherein the dynamic flashing yellow arrow control algorithm is further configured to determine if one or more pedestrians entered the crosswalk from each of the near-side pedestrian waiting zone and the far-side pedestrian waiting zone and, if so, suspend the display of the flashing yellow arrow to the left turning vehicles until all pedestrians have reached the opposite side of the crosswalk.

* * * * *